Aug. 11, 1953  G. F. KAROW  2,648,581
MOTION TRANSMITTING CONNECTION
Filed Oct. 21, 1947  3 Sheets-Sheet 1
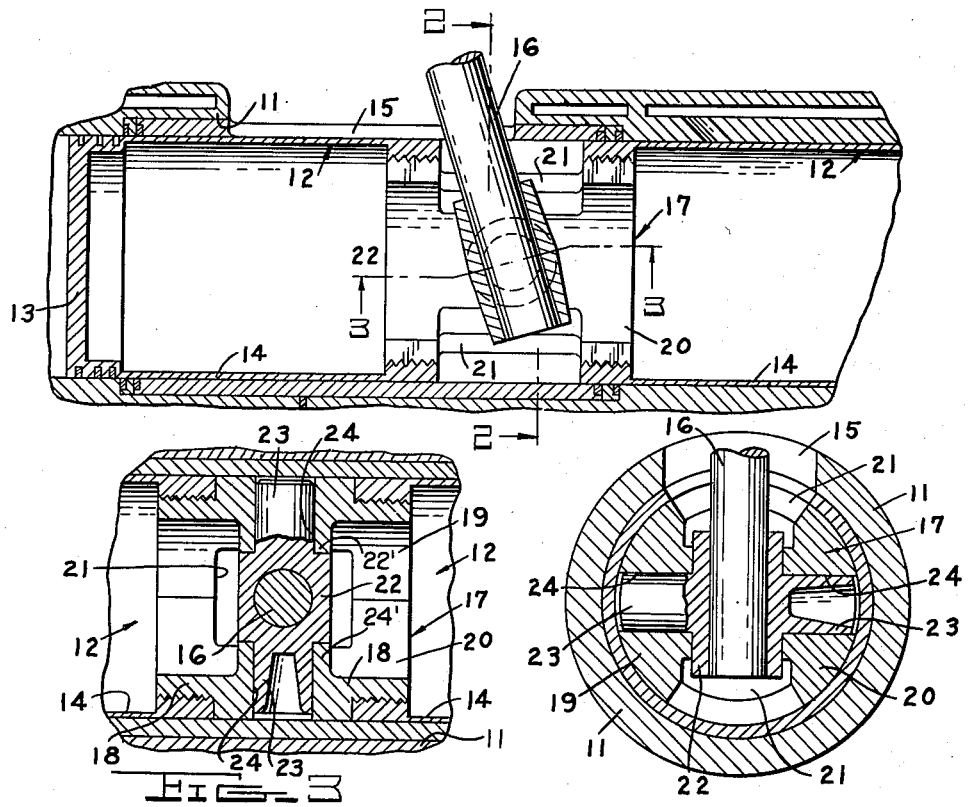
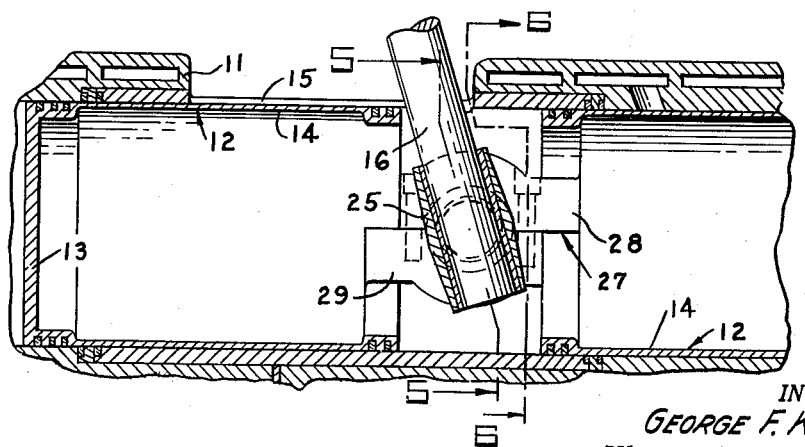
INVENTOR.
GEORGE F. KAROW
BY
ATTORNEYS

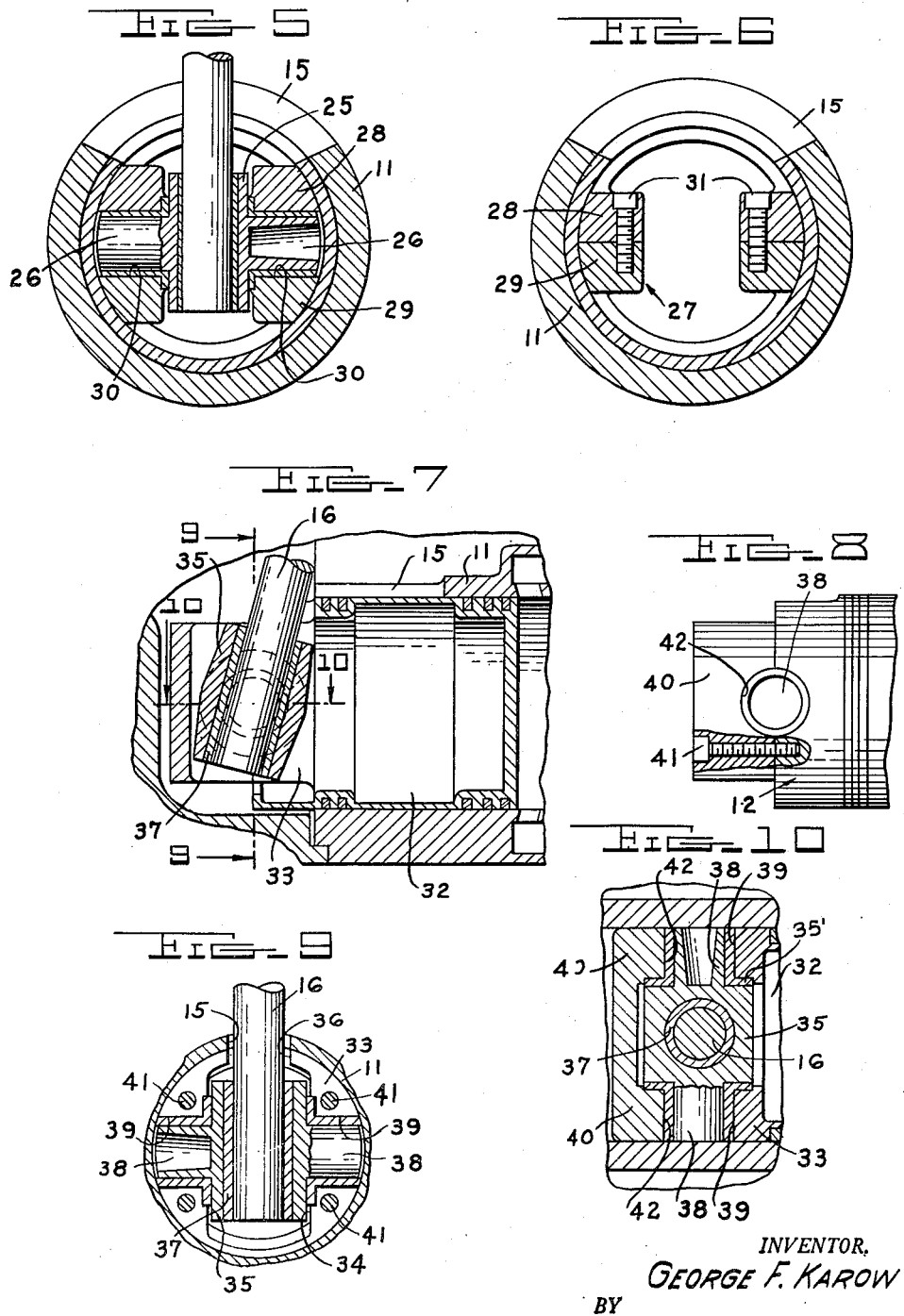

Aug. 11, 1953      G. F. KAROW      2,648,581
MOTION TRANSMITTING CONNECTION
Filed Oct. 21, 1947      3 Sheets-Sheet 3
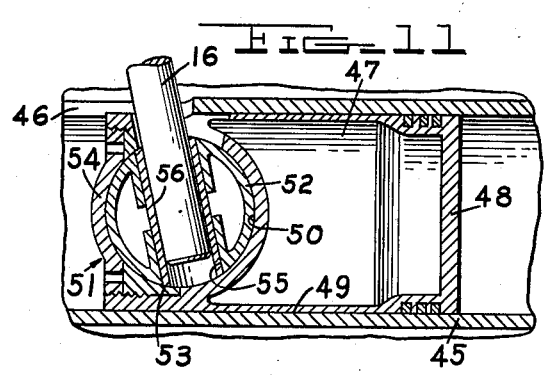
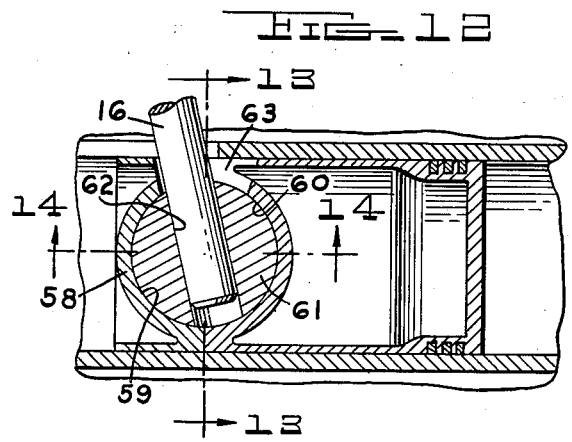
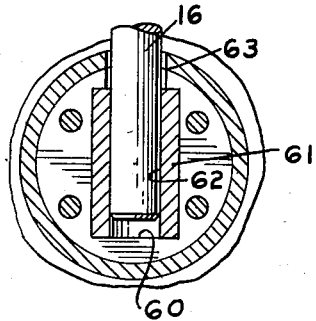 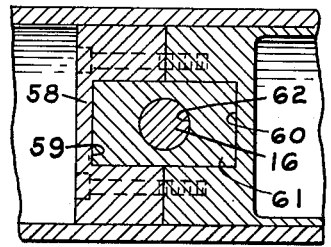
INVENTOR.
GEORGE F. KAROW
BY
ATTORNEYS Patented Aug. 11, 1953

2,648,581

UNITED STATES PATENT OFFICE 2,648,581

MOTION TRANSMITTING CONNECTION

George F. Karow, Saginaw, Mich.

Application October 21, 1947, Serial No. 781,188

6 Claims. (Cl. 309—1)

This invention relates to an improved coupling between parts supported for relative movement in different directions and constructed to move one of the parts in response to movement of the other.

While the invention may be advantageously used in practically all instances where it is desirable to transmit motion from one part to another through a coupling, nevertheless, it finds particular utility when employed in connection with internal combustion engines or displacement pumps having so-called wobble mechanism for operating the pistons in their respective cylinders. Barrel-type internal combustion engines equipped with a wobble mechanism for connecting the pistons to the engine drive shaft are one example of a device in connection with which the present invention may be advantageously used. The cylinders of barrel-type engines are ordinarily concentrically arranged with respect to the wobble mechanism, and the latter usually comprises a wobble plate having arms connected to the pistons supported in the cylinders.

The connection of the free ends of the arms to the pistons introduces a problem of some consequence in engines of the above general type, and it is an object of this invention to overcome this problem by a simple, highly effective coupling. More particularly, this invention provides for connecting the free ends of the arms to the respective pistons with couplings composed of a relatively few simple parts capable of being inexpensively manufactured, assembled and installed.

The foregoing, as well as other objects, will be made more apparent as this description proceeds, especially when considered in connection with the accompanying drawings, wherein:

Fig. 1 is a fragmentary longitudinal sectional view through a cylinder of an internal combustion engine;

Figs. 2 and 3 are respectively sectional views taken on the lines 2—2 and 3—3 of Fig. 1;

Fig. 4 is a longitudinal sectional view similar to Fig. 1, and showing a modified form of construction;

Figs. 5 and 6 are respectively sectional views taken on the planes indicated by the lines 5—5 and 6—6 of Fig. 4;

Fig. 7 is a fragmentary sectional view of still another embodiment of this invention;

Fig. 8 is an elevational view partly in section of the piston shown in Fig. 7;

Figs. 9 and 10 are respectively sectional views taken on the planes indicated by the lines 9—9 and 10—10 of Fig. 7;

Fig. 11 is a fragmentary sectional view of a further embodiment of this invention;

Fig. 12 is a fragmentary sectional view of a still further modification of this invention;

Fig. 13 is a cross sectional view of the construction shown in Fig. 12; and

Fig. 14 is a sectional view taken on the line 14—14 of Fig. 12.

Referring more in detail to the embodiment of the invention shown in Figures 1 to 3 inclusive, it will be noted that the reference numeral 11 indicates a cylinder of sufficient length to slidably support a pair of pistons 12 having head portions 13 and having skirt portions 14. The cylinder is formed intermediate the ends thereof with a slot 15 elongated in the direction of the cylinder and adapted to receive the cylindrical end 16 of an operating arm forming a part of the "wobble" mechanism, not shown herein.

The pistons 12 are secured together in spaced relation axially of the cylinder 11 by a coupling 17 comprising a tubular member having reduced portions 18 at opposite ends respectively threadably engaging the adjacent ends of the skirt portions 14 of the pistons 12. The coupling or tubular member is formed of two complementary half sections 19 and 20 held in assembled relationship by the threaded engagement of the reduced portions 18 with the adjacent ends of the pistons 12. The adjacent edges of the complementary sections 19 and 20 are recessed, and cooperate in the assembled relationship of the sections to provide slots 21 through diametrically opposite sides of the coupling or tubular member. The slot 21 in the side of the coupling adjacent the slot 15 in the cylinder 11 registers with the latter slot and enables extending the free end portion 16 of the operating arm into the coupling in the manner clearly shown in Figure 1 of the drawings.

A sleeve 22 is located in the coupling 17 in a position to receive the free end portion 16 of the operating arm, and is supported on the coupling 17 for rocking movement about an axis perpendicular to the cylinder axis. As shown particularly in Figures 2 and 3 of the drawings, a pair of axially aligned trunnions 23 project outwardly from opposite sides of the sleeve 22 and are respectively journalled in bearings 24 formed in the sections 19 and 20 of the coupling. Thus it will be noted that the connection between the free end portion 16 of the operating arm and adjacent ends of the pistons 12 enables translating reciprocable movement of the pistons to a uniform angular motion of the arm 16. As shown particularly in Figure 3 of the drawings, the sleeve 22 is enlarged intermediate the ends to provide shoulders 22' at the inner ends of the trunnions 23. The shoulders are concentric with the axes of the trunnions 23 and engage suitable shoulders 24' on the coupling 17 to transfer torque reactions from the arm 16 to the cylinder 11.

In assembly the sleeve 22 and associated trunnions 23 are assembled with the coupling 17 prior to securing the latter to the adjacent ends of the pistons 12. In detail one of the trunnions 23 on the sleeve 22 is engaged in the bearing 24 formed on the coupling section 19, for example. The other coupling section 20 is then engaged with the section 19, and during this engagement, the bearing 24 on the coupling section 20 receives the other trunnion 23 on the sleeve. The sections of the coupling thus formed are held in assembled relationship while the sections are threaded at one end into the inner end of one of the pistons 12. The other piston 12 is then threaded on the opposite end of the coupling or sections and the latter are securely held in assembled relationship with the sleeve 22.

The embodiment of the invention shown in Figures 4 to 6 inclusive differs from the first described form of the invention in the manner in which the cylindrical end of the operating arm 16 is coupled to the adjacent ends of the pistons 12. In detail, a sleeve 25 is located between adjacent ends of the pistons in a position to receive the inner end portion 16 of the operating arm, and a pair of axially aligned trunnions 26 project outwardly from diametrically opposite sides of the sleeve 25.

The trunnions 26 are connected to the adjacent ends of the pistons 12 by a coupling 27. The coupling 27 comprises two pairs of projections 28 and 29 respectively extending inwardly from the adjacent ends of the pistons. The pair of projections 28 extends at opposite sides of the sleeve 25 and are formed with semi-circular recesses for respectively receiving the trunnions 26. The pair of projections 29 also extend at opposite sides of the sleeve 25 and are formed with semi-circular recesses cooperating with the recesses in the projections 28 to form bearings 30 for the trunnions 26. The projections extending from one piston are removably clamped to the projections extending from the other piston by suitable fastener elements in the form of studs 31. It follows from the above that the coupling 27 also serves to effectively translate reciprocable movement of the pistons to an angular motion of the arm 16.

The embodiment of the invention shown in Figures 7 to 10 inclusive illustrates still another type of coupling between the operating arm 16 and piston. In this embodiment of the invention, only one piston 32 is shown as supported in the cylinder 11 and the operating arm 16 is shown as connected to the outer end of the piston. In detail a boss 33 is formed on the outer end of the piston 32 and a recess 34 is formed in the boss to provide clearance for a sleeve 35. A slot 36 is also formed in the boss at one side thereof for registration with the slot 15 in the cylinder to enable projecting the free end portion 16 of the operating arm into the recess 34. Actually, the free end portion 16 of the operating arm is received by the sleeve 35, and if desired, a bushing 37 may be provided in the sleeve for engaging the operating arm.

A pair of axially aligned trunnions 38 extend outwardly from diametrically opposite sides of the sleeve and respectively engage in semi-circular recesses 39 formed in the boss 33. A cap 40 is secured to the boss 33 by fastener elements 41 and is formed with semi-circular recesses 42 in positions to cooperate with the recesses 39 in forming bearings for the trunnions 38. This construction, like the foregoing embodiments, enables readily connecting the operating arm 16 to the piston and permits effectively translating reciprocable movement of the piston to angular motion of the arm 16.

As shown particularly in Figure 10 of the drawings, the sleeve 35 is formed intermediate the ends with an enlargement providing shoulders 35' at the inner ends of the trunnions 38. The shoulders 35' surround the trunnions 38 and engage suitable shoulders on the boss 33 and cap 40 to transfer torque reactions from the arm 16 to the piston in the cylinder.

Referring now to the embodiment of the invention shown in Figure 11 of the drawings, it will be noted that the reference numeral 45 indicates a part of a cylinder having an elongated slot 46 in one side wall and the numeral 47 designates a piston slidably supported in the cylinder. In accordance with conventional practice the piston has a head 48 and a skirt 49. The inner end of the skirt is formed with a recess 50 shaped to cooperate with a sectional cap 51 to form a spherical socket for a ball 52. The cap 51 comprises a ring 53 adapted to be sleeved in one end of the piston skirt and held in place by a plate 54 threaded in the piston skirt. The plate and ring are formed with spherical recess which form continuations of the recess 50 to form the spherical socket for the ball 52. The ball is rotatably supported in the socket and is formed with a bore 55 extending diametrically through the ball. A sleeve 56 is secured in the bore 55 and slidably receives the free end of the arm 16. The arm 16 projects through the elongated slot 46 and the socket is also slotted to enable extending the arm into the sleeve 56. Thus, the arm 16 is not only connected to the piston for universal movement relative thereto, but is also capable of sliding and rotative movement relative to the piston.

In the embodiment of the invention shown in Figures 12 to 14 inclusive, a cap 58 is removably secured to the skirt end of the piston and is formed with a semi-circular recess 59 which cooperates with a semi-circular recess 60 formed in the skirt end of the piston to provide a bearing having its axis extending perpendicular to the cylinder axis. A shaft 61 is rotatably supported in the bearing and is formed with a bore 62 having its axis extending at right angles to the cylinder axis and the shaft axis. The cylindrical end of the operating arm 16 projects through an elongated slot in one side of the cylinder and slidably engages in the bore 62. In this connection it will be noted that the bearing is slotted at 63 opposite the slot in the cylinder to enable extending the arm into the bore 62.

What I claim as my invention is:

1. A device comprising a cylinder having an opening in one side wall, a piston slidable in the cylinder and having head and skirt portions, an arm having one end portion extending into the cylinder through said opening, a boss on the skirt end of the piston having a slot for receiving the end of the arm and having semi-circular recesses at opposite sides of the slot, a sleeve located in the slot in a position to slidably receive the end aforesaid of the arm, axially aligned trunnions extending outwardly from opposite sides of the sleeve and seated in the recesses formed in said boss, and a cap detachably secured to the boss and having semi-circular recesses cooperating with the recesses in said boss to provide bearings for said trunnions.

2. The structure set forth in claim 1 in which said sleeve is provided with shoulders respectively surrounding the inner ends of the trunnions and facing outwardly from said sleeve in the direction of the trunnion axes, and in which said boss and cap have portions which cooperate with one another to provide shoulders respectively engaging the shoulders on said sleeves to cooperate with the last-mentioned shoulders in transferring torque reactions from said arm to said piston.

3. A device comprising a cylinder having an elongated slot through one side wall, a piston slidable in the cylinder and having an annular skirt portion, a head at one end of the skirt and a wall adjacent the opposite end of the skirt shaped to form a recess, said skirt and wall having slots registering with the slot in said cylinder, a part removably secured to the wall and cooperating with the recess to form a bearing having its axis extending in a direction transverse to the cylinder axis, a shaft rotatably supported in the bearing and having a bore extending in a direction transverse to both the cylinder axis and the axis of the shaft, and an arm extending through the registering slots aforesaid and having a cylindrical part supported in said bore for both rotation and sliding movement.

4. The combination with a reciprocable member, an arm having a cylindrical portion and supported for angular movement relative to the path of travel of the reciprocable member, of a coupling between the arm and reciprocable member, said coupling comprising a sleeve for slidably and rotatably receiving the cylindrical portion of the arm, aligned journals projecting from diametrically opposite sides of the sleeve with the axes thereof extending generally normal to the sleeve axis, a part carried by the reciprocable member at one end of the latter, and a cap removably secured to the part and cooperating with said part to provide bearings for said journals.

5. The combination set forth in claim 4 in which the sleeve has shoulders respectively surrounding the inner ends of the journals and facing outwardly from the sleeve in the direction of the respective journal axes, and in which the part and cap have portions which cooperate with one another to provide shoulders respectively engaging the shoulders on the sleeve to cooperate with the last-mentioned shoulders in transferring torque reactions from the arm to the reciprocable member.

6. A device comprising a cylinder having an elongated slot through one side wall, a piston slidable in the cylinder and having a pair of diametrically opposed recesses near one end thereof, a part removably secured to said end of the piston and cooperating with said recesses to provide aligned bearings having a common axis extending transversely of the axis of the cylinder, a sleeve having aligned trunnions projecting outwardly from opposite sides thereof and supported for rotation in said bearings, and an arm having one end extending through the slot in said cylinder and slidably engaged in said sleeve.

GEORGE F. KAROW.

References Cited in the file of this patent

UNITED STATES PATENTS

| Number | Name | Date |
|---|---|---|
| 558,943 | Gardner | Apr. 28, 1896 |
| 1,348,814 | Larsson | Aug. 3, 1920 |
| 1,367,914 | Larsson | Feb. 8, 1921 |
| 1,616,137 | Palmer | Feb. 1, 1927 |
| 1,648,000 | Lee | Nov. 8, 1927 |
| 2,112,934 | Stinnes et al. | Apr. 5, 1938 |
| 2,304,054 | Oldfield | Dec. 1, 1942 |

FOREIGN PATENTS

| Number | Country | Date |
|---|---|---|
| 163,857 | Great Britain | June 2, 1921 |
| 439,223 | France | June 8, 1912 |
| 556,396 | France | July 19, 1923 |